Patented June 2, 1925.

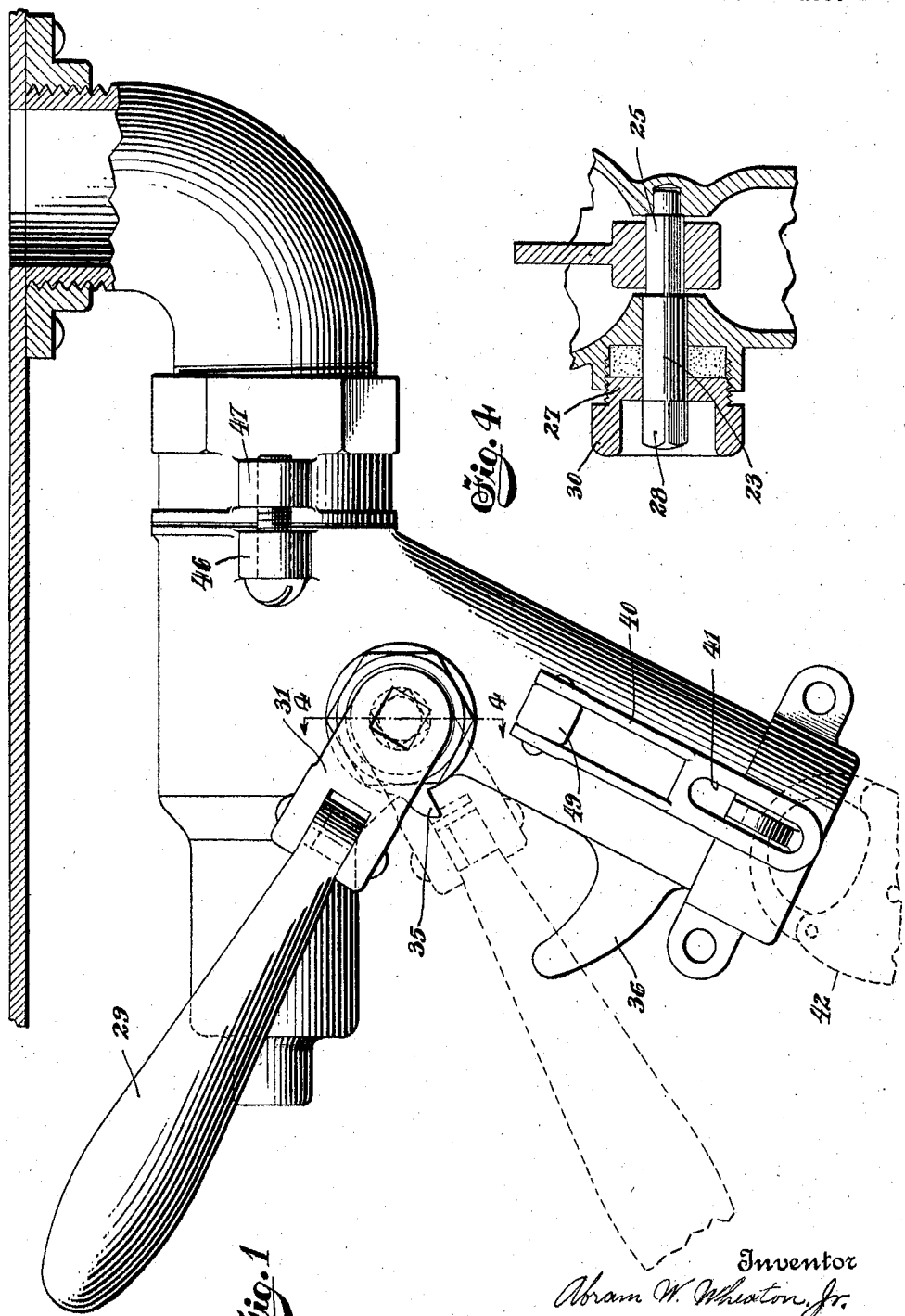

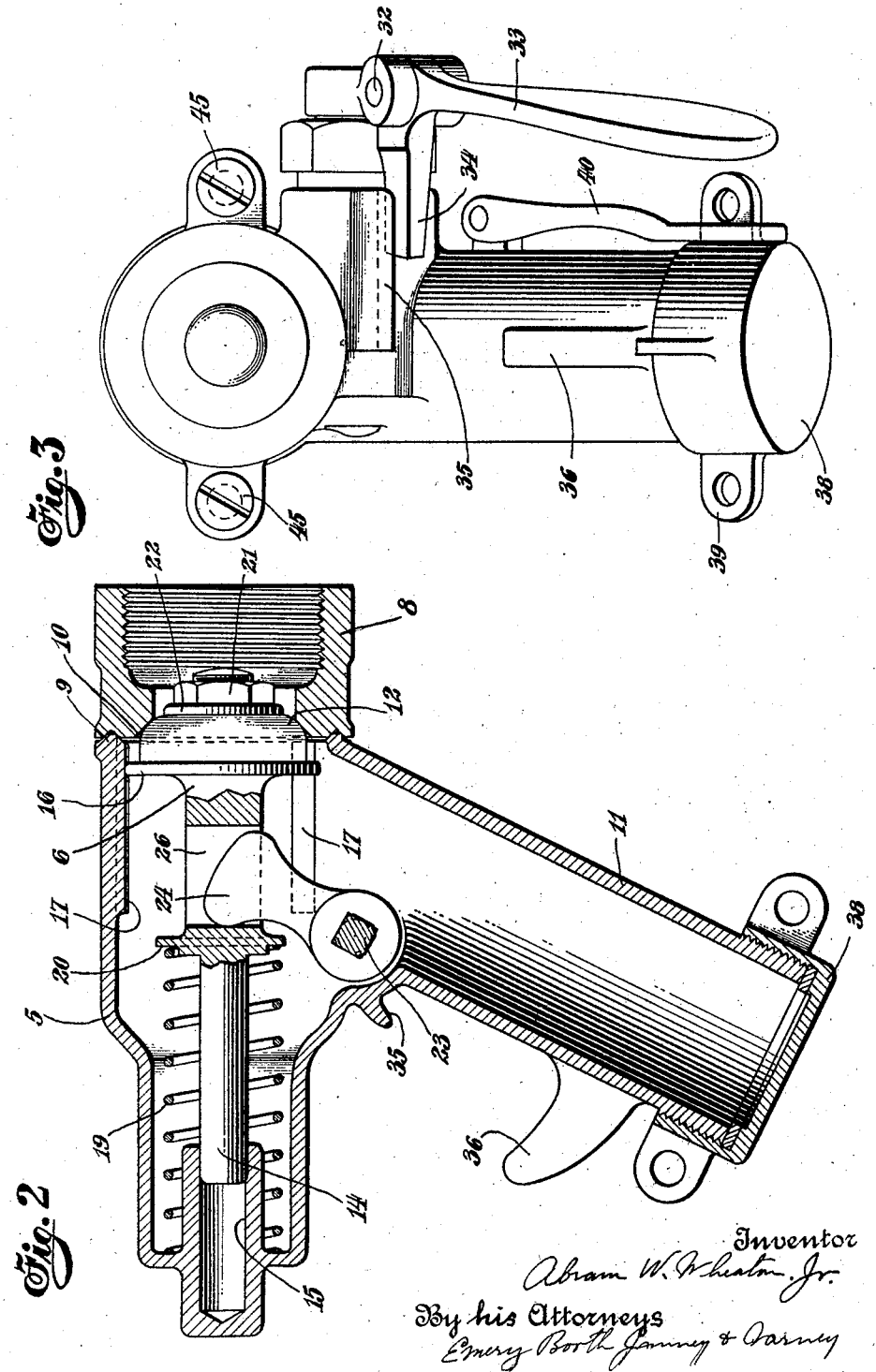

1,540,736

UNITED STATES PATENT OFFICE.

ABRAM W. WHEATON, JR., OF NEWARK, NEW JERSEY, ASSIGNOR TO A. W. WHEATON BRASS WORKS, OF NEWARK, NEW JERSEY, A CORPORATION.

SELF-CLOSING FAUCET FOR TANK WAGONS.

Application filed December 29, 1922. Serial No. 609,566.

*To all whom it may concern:*

Be it known that I, ABRAM W. WHEATON, Jr., a citizen of the United States, residing at Newark, in the county of Essex and State of New Jersey, have invented an Improvement in Self-Closing Faucets for Tank Wagons, of which the following is a specification.

The present invention relates to faucets for tank wagons such as used for distributing oil and gasoline.

The invention has for an object to provide a self-closing faucet of simple, strong and durable construction and one which can conveniently and easily be applied to a tank wagon with a minimum of fittings. It is also an object to provide a faucet which can be applied to the bottom of a tank to lie close to the tank bottom leaving space for large cans to be filled therefrom.

Faucets commonly used on tank wagons must on account of their shape or method of operation be so located as to project a substantial distance below the bottom of the tank thus subtracting from the space available for positioning cans to be filled. The faucet of the present invention because of certain details of the construction of the combined coupler and valve seat member and the arrangement of parts can be attached by a simple elbow connection to the tank and can be applied in a small space and easily removed for repairs.

The nature and objects of the invention will be better understood from a description of a particular illustrative embodiment thereof, reference being had to the accompanying drawings forming a part hereof and in which Fig. 1 is a side view of a self-closing faucet constructed in accordance with and embodying the principles of the invention shown as affixed to the bottom of a tank wagon.

Fig. 2 is a central sectional view of the same.

Fig. 3 is a view in rear elevation.

Fig. 4 is a sectional view taken on the line 4—4 Fig. 1 showing the rotatable valve-retracting spindle and the packing thereof.

In the device shown a valve casing 5 houses a spring pressed valve plunger 6 and means for retracting said plunger. Connected to the forward end of the valve casing is a coupling member 8 for affording connection to a dispensing tank. This coupling member and the valve casing are formed to provide a self centering joint 9 having tapered tongue and groove connection to ensure a fluid tight joint and accurate positioning of the two parts. The coupling member is also formed with a valve seat 10 adjacent the joint 9 and substantially concentric therewith. The casing 5 is formed with a depending spout 11 which opens downwardly from the body portion of the casing or valve chamber closely adjacent the joint 9 between the casing and the coupling member 8. The valve plunger carries at its forward end an annular valve 12 of suitable resilient material seating against the valve seat 10 and forming a tight joint therewith. The valve plunger is reciprocably mounted in the casing having at its rear end a stem 14 which is guided in a sleeve 15 formed in the casing and having near its forward end a flange 16, slidably engaging ways 17 formed on the interior of the casing. The ways are cast in the casing and finished by a turning operation to provide surfaces concentric with the bore of sleeve 15. A spring 19 surrounding the valve plunger, is compressed between a flange 20 and the rear end of the casing to normally hold the valve 12 seated against the valve seat 10. The valve 12 is preferably removable and may be held in place by any suitable means such as a nut 21 and washer 22. Suitable means is provided for retracting the valve plunger 6 against the force of the spring 19. As shown this means consists of a rock shaft 23 rotatably mounted in the valve casing and having an arm 24 engaging a square portion 25 of the shaft 23. This arm projects into a slot 26 of the valve plunger for retracting the same. The rear end wall of the slot 26 is preferably formed at substantially a right angle to the length of the plunger in order to avoid side thrust upon the plunger. The operative head of the arm 25 is preferably formed to provide for operative engagement with the rear end of the slot 26 at a point substantially on the axis of the plunger so that the retractile force operates centrally. The shaft 23 projects outwardly through the stuffing box 27 presenting a square portion 28 to receive an operating handle 29. As shown the follower nut 30 of the stuffing box is formed to provide a recess which houses the projecting square outer end 28 of the shaft 23. The handle shown is formed in two parts having an inner shaft engaging portion 31 to which is pivoted at 32 an outer handle portion 33 which is provided with an inwardly extending lug 34 adapted to engage beneath a projection 35 formed on the casing to hold the valve in open position. The construction of this handle is more particularly set forth and claimed in my Patent No. 1,255,370 granted February 5, 1918, and need not be further described herein. The spout portion of the casing is formed with a hook 36 for supporting cans and other receptacles beneath the spout.

A removable screw cap 38 closes the lower end of the spout, the screw cap being provided with apertured lugs 39 any one of which may be engaged by a pivoted arm 40 having a slot 41 to hold the cap in adjusted position. A padlock 42 may be inserted through the apertured lug to prevent removal of the cap.

The valve casing 5 and coupling 8 are secured together by tap bolts 45 extending through lugs 46 on the casing threaded into lugs 47 on the coupling member. These bolts are made strong enough to withstand the strain due to supporting cans upon the hook 36. This construction and manner of securing together the coupler and casing facilitates disconnecting the parts for cleaning or repair and makes it possible to place the valve close to the bottom of the tank to economize space.

It is to be noted that the construction of the faucet is simple and inexpensive though strong and durable and that they can be easily taken apart for repair, replacement of worn valves and the like by relatively unskilled labor. The coupling member is so formed that it can be easily removed and when removed the valve seat is exposed conveniently for grinding.

Claims:

1. A self-closing faucet for tank wagons comprising a casing providing a valve chamber and a spout, a coupling member bolted to the casing and forming therewith a self-centering joint having a tapered tongue and groove connection, said coupling member having a valve seat presented toward the casing adjacent the self-centering joint, a valve plunger reciprocably mounted in the valve casing seating on said valve seat, said plunger being flanged at its lower end and means for guiding the valve plunger, comprising a bore in the valve casing adapted to receive and hold the upper end of said plunger and slidably engaging ways grooved in said valve-casing adapted to receive and hold the flanged end of said plunger, the center of curvature of said grooves or ways being coincident with the center of curvature of the said bore, a coil spring surrounding the valve plunger and compressed between the casing and a shoulder on the valve plunger normally maintaining the valve in seated position and means for retracting and unseating the valve against the force of the spring comprising a transverse rock shaft mounted in the casing and having an arm projecting into a slot in the valve plunger and engaging against the vertical end wall of said slot to retract the plunger, said rock shaft projecting without the casing at one end, and an operating handle attachable to said projecting end of the rock shaft.

2. In a tank wagon the combination with a tank of a faucet comprising a two-part casing, one part having an outwardly extending valve seat closely adjacent the joint, and the second part having guideways closely adjacent the joint, a longitudinal, movable valve member arranged to seat on the aforesaid valve seat against the pressure of fluid in the tank and having a flange closely adjacent the valve head and bearing against the aforesaid guideways, the valve stem projecting and having bearing in a cylindrical bore forming an extension of the casing, and a spring surrounding said projecting valve stem and operative to seat the valve against the pressure of fluid in the tank substantially as and for the purpose described.

In testimony whereof, I have signed my name to this specification this 27th day of December, 1922.

ABRAM W. WHEATON, Jr.